United States Patent [19]
Galgano, Jr. et al.

[11] Patent Number: 6,111,947
[45] Date of Patent: Aug. 29, 2000

[54] INTELLIGENT SERVICES NETWORK ADJUNCT PROCESSOR

[75] Inventors: Robert F. Galgano, Jr., Iowa City; Patrick Lutwitze, Cedar Rapids; Glenn E. Highland, Marion; Sarah A. Miller; Tivis C. Mobberley, both of Cedar Rapids; Christopher P. Tofanelli, Marion; Timothy Darland, Cedar Rapids; Samuel Mullins, Iowa City, all of Iowa

[73] Assignee: MCI Communications Corporation, Washington, D.C.

[21] Appl. No.: 08/752,965

[22] Filed: Dec. 2, 1996

[51] Int. Cl.⁷ ........................................ H04M 1/64
[52] U.S. Cl. ......................... 379/269; 379/265; 379/309
[58] Field of Search .................... 379/265, 266, 379/309, 207, 201, 220, 221, 279, 269, 213, 214

[56] References Cited

U.S. PATENT DOCUMENTS

| | | | |
|---|---|---|---|
| 4,737,983 | 4/1988 | Frauenthal et al. | 379/221 |
| 5,500,891 | 3/1996 | Harrington et al. | 379/265 |
| 5,590,188 | 12/1996 | Crockett | 379/207 |

*Primary Examiner*—Ahmad F. Matar

[57] ABSTRACT

A system for routing telephone calls to operator consoles based on the type of call so that an appropriate operator can handle the call. The system comprises an Automated Call Distributor (ACD), adjunct processor nodes, and a call routing distribution system. The ACD receives calls, offers the calls to an adjunct processor node, receives instructions on routing the calls from the adjunct processor node, and routes the calls based on the received instructions. The ACD has links through which the calls are offered and the instructions on call routing are received. Each adjunct processor node is connected to the ACD through the links. The adjunct processor node receives call routing specifications from the call routing distribution system, receives the offered calls, determines to which operator console (or group of operator consoles) the offered call should be routed based on the call routing specifications, and provides an indication of the determined operator console to the ACD through a link as routing instructions. Each link of the ACD is connected to two adjunct processor nodes so that if one adjunct processor node fails, the ACD can receive instructions from the other adjunct processor to which a link is connected. The call routing distribution system inputs call routing specifications and distributes the call routing specifications to the adjunct processor nodes so that each adjunct processor node has the same call routing specification.

11 Claims, 14 Drawing Sheets

| ISNAP HMI | | | | | □ □ |
|---|---|---|---|---|---|
| SESSION | CALL PROC DATA | CONFIG DATA | CONTROL | MANAGEMENT | SECURITY |

Tables
- ANI #
- NPA
- Assoc ANI
- Carrier
- ⋮

Action
- ADD
- UPDATE
- DELETE
- VIEW
- ⋮

| ENTER | CLEAR | STOP | PREVIOUS | NEXT |
|---|---|---|---|---|

FIG. 4C

| Level 1 | Level 2 | Level 3 | Level 4 | Level 5 |
|---|---|---|---|---|
| SESSION | Quit | | | |
| CALL PROC DATA | List of ISNAP Sites | List of nodes at each site | Tables:<br>ANI<br>NPA<br>ASSOC ANI<br>CARRIER<br>CLD#<br>INTL<br>BNOA<br>SITE NUM<br>ASSOC OSID | |
| | | | Actions:<br>Add<br>Delete<br>Update<br>View<br>View All<br>Print All | |
| CONFIG DATA | List of ISNAP Sites | List of Nodes at each site | DB TABLES:<br>Group<br>Link<br>Nodename | |
| | | | DB Actions:<br>Add<br>Delete<br>Update<br>View<br>View All<br>Print All | |

FIG. 5A

| Level 1 | Level 2 | Level 3 | Level 4 | Level 5 |
|---|---|---|---|---|
| CONTROL | List of ISNAP Sites | List of Nodes at each site | Links | List of Links + "All" |
| | | | Actions | Start<br>Stop<br>Status |
| | | | Processes | ICDS Processes:<br>  ALARM SCREENER<br>  MONITOR AGENT<br>  DB UPDATER<br>  DID_x<br>  CM_x<br>  CSCM_x<br>  CPS_AGENT_x_y<br>  CPS_PSEL<br>  CPS_DB<br>  CPS_UDP<br>  NIM<br>Alpha Processes:<br>  CALL PROCESSING<br>  ALARM SCREENER<br>  HMI AGENT<br>  TSCM<br>  GSEL<br>  ACD_MGR<br>  DC_MGR<br>  NIM<br>  SWITCH<br>  UPDATE MANAGER |
| MANAGEMENT | Terminal Access | | | |
| | Operational Measurements | | | |
| SECURITY | Privileges | | | |
| | User Names | Add<br>Delete | | |

FIG. 5B

NPA Table

| acd_sw_id | npa | zero_minus | zero_plus | zero_one_plus | time_out | default | ... | ... |
|---|---|---|---|---|---|---|---|---| key: acd_sw_id, npa
groups: zero_minus, zero_plus, zero_one_plus, time_out, default

FIG. 6A

Associated ANI Table

| assoc_id | acd_sw_id | assoc_X | group | ... |
|---|---|---|---|---| key: assoc_id, acd_sw_id, assoc_X

FIG. 6B

Carrier Table

| acd_sw_id | carrier | zero_minus | zero_plus | zero_one_plus | time_out | inbound - intl | direct distance dial | default | mci_carrier_flag | reorig_carrier_flag | ... |
|---|---|---|---|---|---|---|---|---|---|---|---| key: acd_sw_id, carrier
groups: zero_minus, zero_plus, zero_one_plus, time_out, inbound - intl, direct distance dial, default
flags: mci_carrier_flag, reorig_carrier_flag

FIG. 6C

Group Table

| acd_sw_id | group | acd_group | group_name | ... |
|---|---|---|---|---| key: acd_sw_id, group
data: acd_group, group_name

FIG. 6D

International Table

| acd_sw_id | pcc | lang | nacc | group | ... |
|---|---|---|---|---|---| key: acd_sw_id, pcc, lang, nacc

FIG. 6E

ANI Table

| acd_sw_id | aniX | zero_minus | zero_plus | zero_one_plus | time_out | default |
|---|---|---|---|---|---|---| key: acd_sw_id, aniX

FIG. 6F

Site Number Table key { site_num
     group
...

FIG. 6I

Called Number Table key { acd_sw_id
     cldX
data { group
     flag3
     flag6
     flag10
     flag15
     flag25
     assoc_id

FIG. 6H

Associated OSID Table key { acd_sw_id
     cld15
     osid_otg
     group
...

FIG. 6K

Link Table key { link_id
     acd_sw_id
data { link_set_id
     nodename
     device_name
     default_link
...

FIG. 6G

Billing #NOA Table key { Billing_NOA
     group
...

FIG. 6J

INTELLIGENT SERVICES NETWORK ADJUNCT PROCESSOR

TECHNICAL FIELD

The present invention relates generally to telephone call processing system and, more particularly, to routing calls to operators.

BACKGROUND OF THE INVENTION

Telecommunications carriers continually strive to provide increasingly faster and more reliable services when a customer places a telephone call. Most telephone calls are direct dial calls, that is, the customer places the call without expecting operator intervention and the call is connected without operator intervention. However, certain telephone calls require operator intervention for one reason or another. For example, a customer may need to orally provide billing instructions to an operator. In such a case, the customer may dial "0" followed by the number to be called (e.g., 0-555-555-5555). Such a call is referred to as a "0+" call since a zero plus the number is dialed. Alternatively, a customer may simply dial "0" and expect to provide both the number to be called and billing instructions to an operator orally. Such a call is referred to as a "0–" call since a zero without (minus) a number is dialed.

When a call that requires operator assistance is dialed, it is important that that call be quickly routed to an operator who is able to assist the caller. For example, a call that is originated in France should be routed to an operator who speaks French. Also, a call that originates with a different telecommunications carrier should be routed to an operator who has some knowledge of that different telecommunications carrier.

Telecommunications carriers route calls that require operator intervention through Automated Call Distributors (ACDs). An ACD is a device that receives calls and routes the calls based on routing instructions to operators. ACDs are generally coupled to a call processing computer system that provides the routing instructions. When the ACD receives a call, it notifies the call processing computer system that the call has been received and provides information describing the call (e.g., "offers the call"). The call processing computer system then provides routing instructions based on the information describing the call to the ACD. The ACD then routes the call as instructed. The speed and reliability of the call processing computer system directly impacts the speed and reliability of the services provided to a customer. For example, if the call processing computer system cannot provide routing instructions in a timely manner, the customer will become frustrated at the wait and may hang up. Furthermore, if the call processing computer system fails, then calls may be routed to a default operator who may not even speak the language of the customer.

SUMMARY OF THE INVENTION

The present invention provides a system for routing telephone calls to operator consoles based on the type of call so that an appropriate operator can handle the call. The system comprises an Automated Call Distributor (ACD), adjunct processor nodes, and a call routing distribution system. The ACD receives calls, offers the calls to an adjunct processor node, receives instructions on routing the calls from the adjunct processor node, and routes the calls based on the received instructions. The ACD has links through which the calls are offered and the instructions on call routing are received. Each adjunct processor node is connected to the ACD through the links. The adjunct processor node receives call routing specifications from the call routing distribution system, receives the offered calls, determines to which operator console (or group of operator consoles) the offered call should be routed based on the call routing specifications, and provides an indication of the determined operator console to the ACD through a link as routing instructions. Each link of the ACD is connected to two adjunct processor nodes so that if one adjunct processor node fails, the ACD can receive instructions from the other adjunct processor to which a link is connected. The call routing distribution system inputs call routing specifications and distributes the call routing specifications to the adjunct processor nodes so that each adjunct processor node has the same call routing specification.

BRIEF DESCRIPTION OF THE DRAWINGS

FIGS. 4A–4C illustrate sample displays generated by the HMI component.

FIGS. 5A and 5B show the menu options available for each menu.

FIGS. 6A–6K are diagrams of various tables used by the Group Selection component and maintained by the ICDS.

DETAILED DESCRIPTION OF THE INVENTION

The present invention provides a call processing system that is referred to as the Intelligent Services Network Adjunct Processor (ISNAP) system. The ISNAP system provides call processing services that include selecting a group of operator consoles to which a received call should be routed based on multiple criteria and routing messages between an ACD and the operator consoles. The ISNAP system executes on a computer, referred to as an ISNAP node, that is connected to the ACD and to the operator consoles. When an ISNAP node is offered a call by the ACD, the ISNAP node compares information describing the offered call to call routing specifications to determine to which group the call should be routed. The ISNAP node then sends the identification of the group to the ACD. The ACD then routes the offered call to that group. In addition, the ISNAP node serves as a conduit for sending messages between the ACD and the operator consoles. When the ISNAP node receives a message from the ACD, it converts the message to a format compatible with the operator console and sends the message to the operator console. Conversely, when the ISNAP node receives a message from an operator console, it converts the message to a format compatible with the ACD and sends the message to the ACD.

Multiple ISNAP nodes can be connected to an ACD to provide the call processing services in a manner that is both redundant and scaleable. The call processing services are redundant because each link from the ACD is connected to two ISNAP nodes. Thus, if one ISNAP node fails, the calls offered on its links can be handled by other ISNAP nodes.

Moreover, since each ISNAP node contains the same call routing specifications, the group to which a call is to be routed is independent of the ISNAP node to which the call is offered. The call processing services are scaleable because any number of ISNAP nodes can be connected to the ACD to accommodate the size and speed of the ACD and to accommodate the number of operator consoles.

The ISNAP nodes interface with an ISNAP Control and Distribution System (ICDS). The ICDS provides a centralized mechanism for controlling and monitoring the operations of the ISNAP nodes and for inputting and distributing the call routing specifications to the ISNAP nodes. The ICDS provides a Human Machine Interface (HMI) component through which a user can add, delete, and modify the call routing specifications and control and view the operations of the ISNAP nodes. The ICDS is responsible for distributing updates to the call routing specifications to each ISNAP node to ensure that each ISNAP node has the same specifications.

Figure 1:
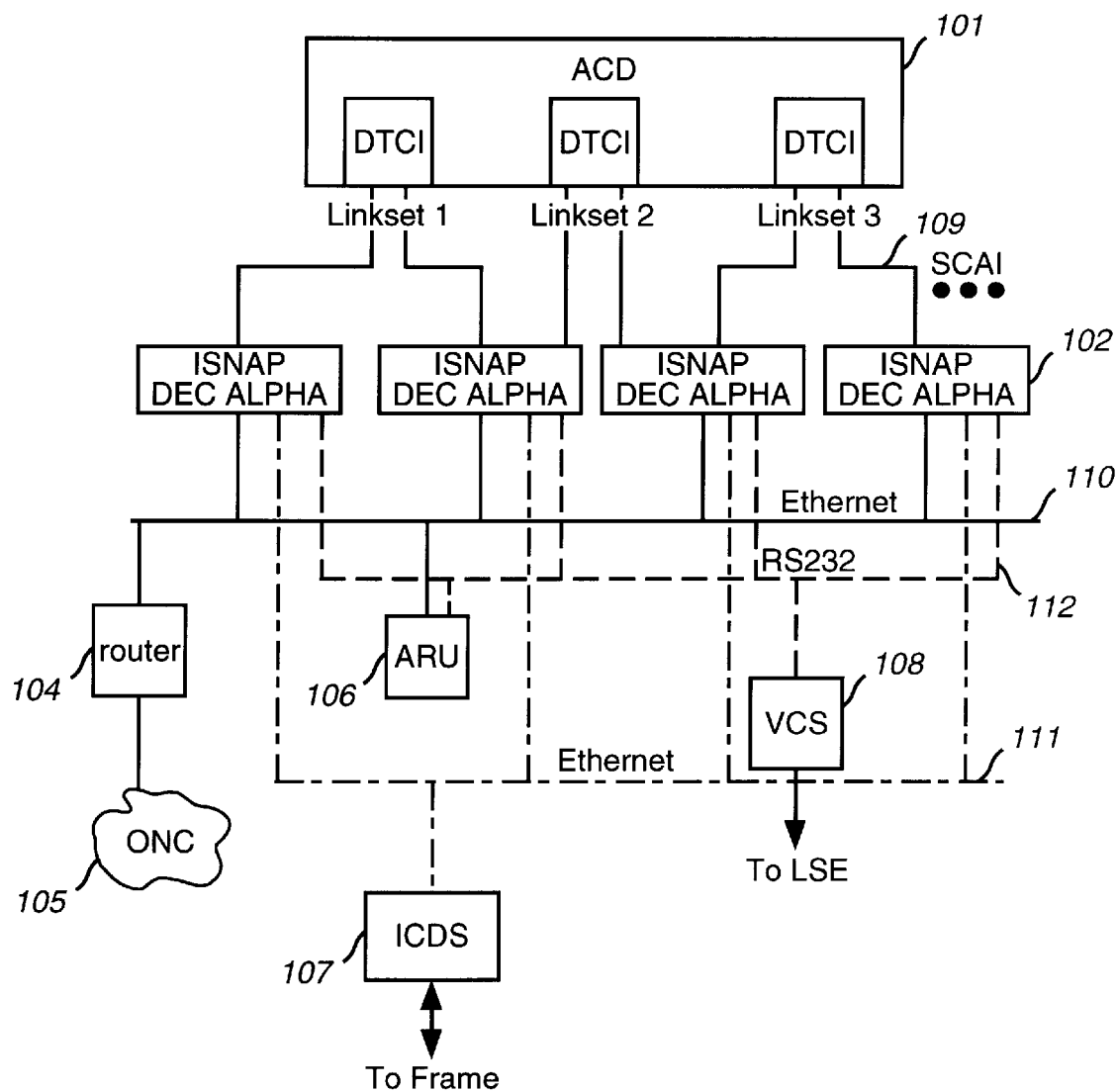
FIG. 1 is a block diagram of the ISNAP architecture.

FIG. 1 is a block diagram of the ISNAP architecture. The ISNAP architecture comprises the Automated Call Distributor (ACD) 101, the ISNAP nodes 102, the router 104, the Operator Network Center (ONC) 105, the Audio Response Unit (ARU) 106, the ISNAP Control and Distribution System (ICDS) 107, and the VAX Cluster Console System (VCS) 108. The ACD is connected to each ISNAP node via links 109. The ISNAP nodes, the router, and the ARU are connected via an Ethernet link 110. The ISNAP nodes and the ICDS are connected via another Ethernet 111. The router is connected to the ONC, which may include automated or manual operator consoles. The ISNAP nodes and the ARU send messages to the VCS via the RS232 link 112 so that the messages can be viewed at a computer operator console. The ARU is a group of automated operator consoles that can handle many calls simultaneously. Connections between the ACD and the ISNAP nodes are implemented using linksets. A linkset is composed of two Switch Computer Application Interface (SCAI) links originating from the same device of the ACD and terminating at the ISNAP node. These links are distributed between two ISNAP nodes to provide redundancy. To allow messages to pass between an operator console and the ACD, each operator console is associated with a linkset and each linkset is associated with multiple operator consoles. Thus, when a message is sent between an ACD and an operator console, the message is sent via the associated linkset. If an ISNAP node fails, then the messages for the links connected to the failed ISNAP node can be routed through the other ISNAP node to which that linkset is connected. The ISNAP processor nodes preferably include a Digital Equipment Corporation (DEC) Alpha AXP System running Open VMS.

Figure 2:
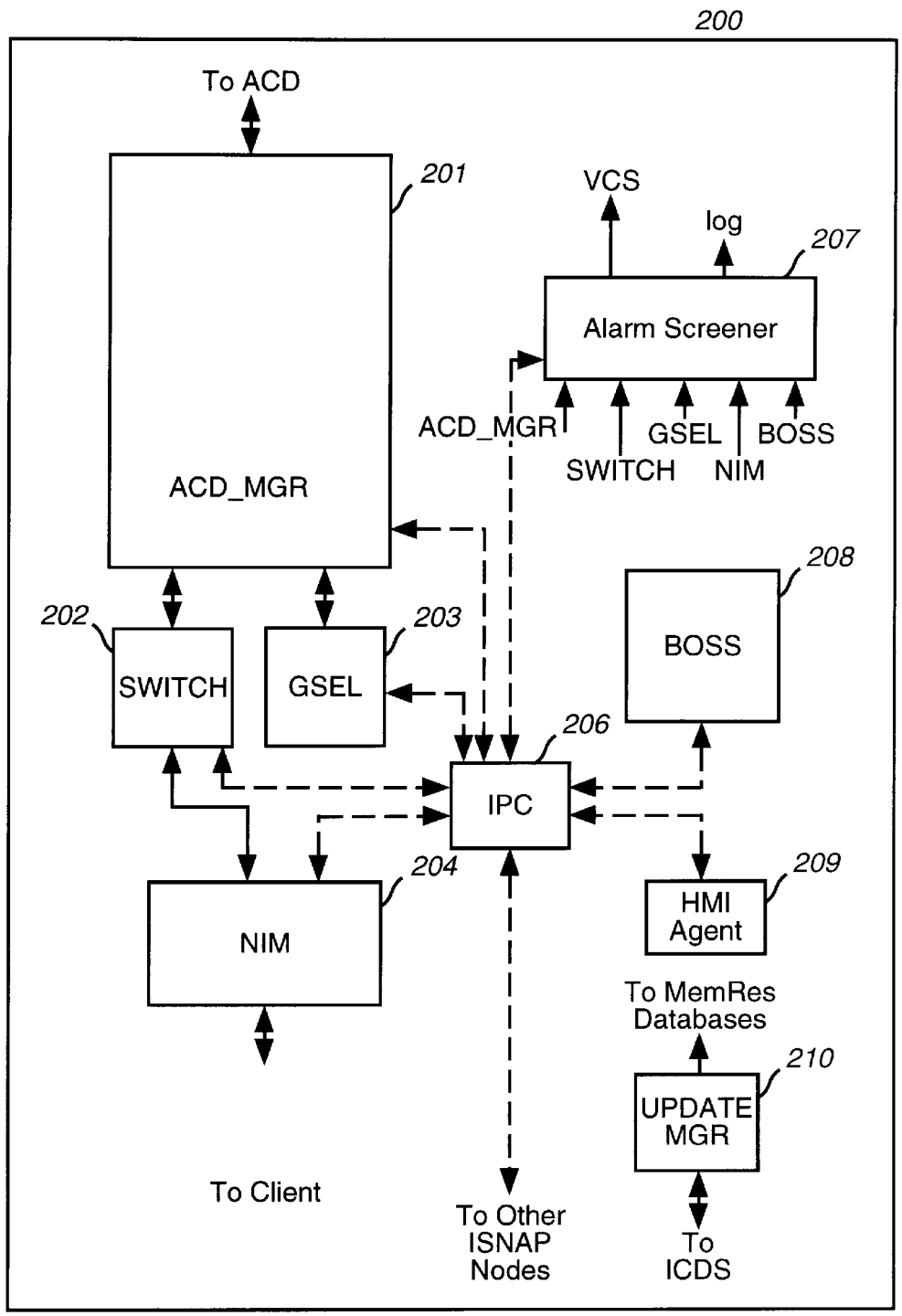
FIG. 2 is a block diagram of the components of an ISNAP node.

FIG. 2 is a block diagram of the components of an ISNAP node. The ISNAP node 200 contains an ACD Manager component 201, a Switch component 202, a Group Selection component 203, an NSPP Interface Module (NIM) component 204, an InterProcess Communication (IPC) component 206, an Alarm Screener component 207, a Basic OverSeer Service (BOSS) component 208, a Human Machine Interface (HMI) Agent component 209, and an Update Manager component 210. Each of these components executes as a separate process under control of the operating system.

The Basic Overseer Service (BOSS) component starts and controls all processes required by the ISNAP node. On startup, the BOSS component reads configuration files to determine which processes it is to start, how to start the processes, the shutdown order of the process, the heartbeat intervals for the processes, and various other configuration parameters on features that can be selectively set when the BOSS component is started. Once started, the primary function of the BOSS component is to monitor the status of the processes that it started. Each component is responsible for notifying the BOSS component periodically (i.e., heartbeat intervals). If the BOSS component does not receive a notification at the prescribed interval from a component, then the BOSS component knows that that component has failed. If one of those components fails, the BOSS component generates an alarm and may restart the downed component, leave the component down, set down portions of other components, or completely shut down other components.

The Alarm Screener component receives all alarms from the other components, formats them, and sends them to the VCS. Each component sends an alarm to the Alarm Screener component when a condition arises in the component that may need attention. The Alarm Screener screens the alarms that it receives and sends only certain alarms to the VCS. The Alarm Screener component compares the alarm number of each alarm to a configuration file containing alarm numbers. If the alarm number is in the configuration file, then the alarm is sent to the VCS. Thus, the Alarm Screener component screens alarms based on the configuration file. The Alarm Screener component also logs all alarms.

The ACD Manager component serves as a gateway for communications between the ISNAP node and the ACD. SCAI transaction messages, encoded according to basic encoding roles (BER) format, are bidirectionally exchanged between ISNAP nodes and the ACD. The ACD manager manages this exchange and performs the translation of all call processing message traffic as well as default operator group selection services when the Group Selection component is unavailable. The ACD manager provides for group selection on the "nature of address" (i.e., call type). The ACD provides group selection for the following call types: 0−, 0+, 01+, the direct distance dial (DDD), timeout, inbound international, and others. If the Group Selection component is available, the ACD Manager component sends an invoke message to the Group Selection component. The Group Selection component selects an appropriate operator group and forms a call response that is sent back to the ACD via the ACD Manager component. The ACD Manager component also interfaces with the ACD to activate and deactivate the links.

The Group Selection component provides the selection of the group of operator consoles to which a call is to be routed. This component determines which group of operator consoles is appropriate to handle an incoming call. This component uses various RAM resident tables to categorize the calls based on initial call information provided by the ACD. The Group Selection component is described in detail below.

The Switch component is responsible for translating the messages flowing between the ACD and the operator consoles (i.e., the Switch component converts the message from the client format to the ACD format and vice versa). The Switch component maintains an internal relationship of terminal identification (TID) of the ACD and operator console handle pairs. This relationship allows the Switch component to map TIDs of the ACD to the appropriate operator console handle. The NIM component is responsible for mapping the operator console handle to the appropriate client address and forwarding messages to the operator console.

The HMI Agent component receives requests for information about the status of the ISNAP node and provides the information to the requester. The information includes real time counts on the operation of the ISNAP node and status of the various components. The IPC component handles interprocess communication between components within the ISNAP node and across ISNAP nodes in the system.

The Update Manager component receives data from ICDS nodes and updates the various tables in RAM and a copy of each table on disk. The Update Manager component performs the processing required to initialize the memory resident tables. The Update Manager component also processes the update, add and delete requests from DB Update component of the ICDS. The Update Manager component is described below in detail.

Figure 3:
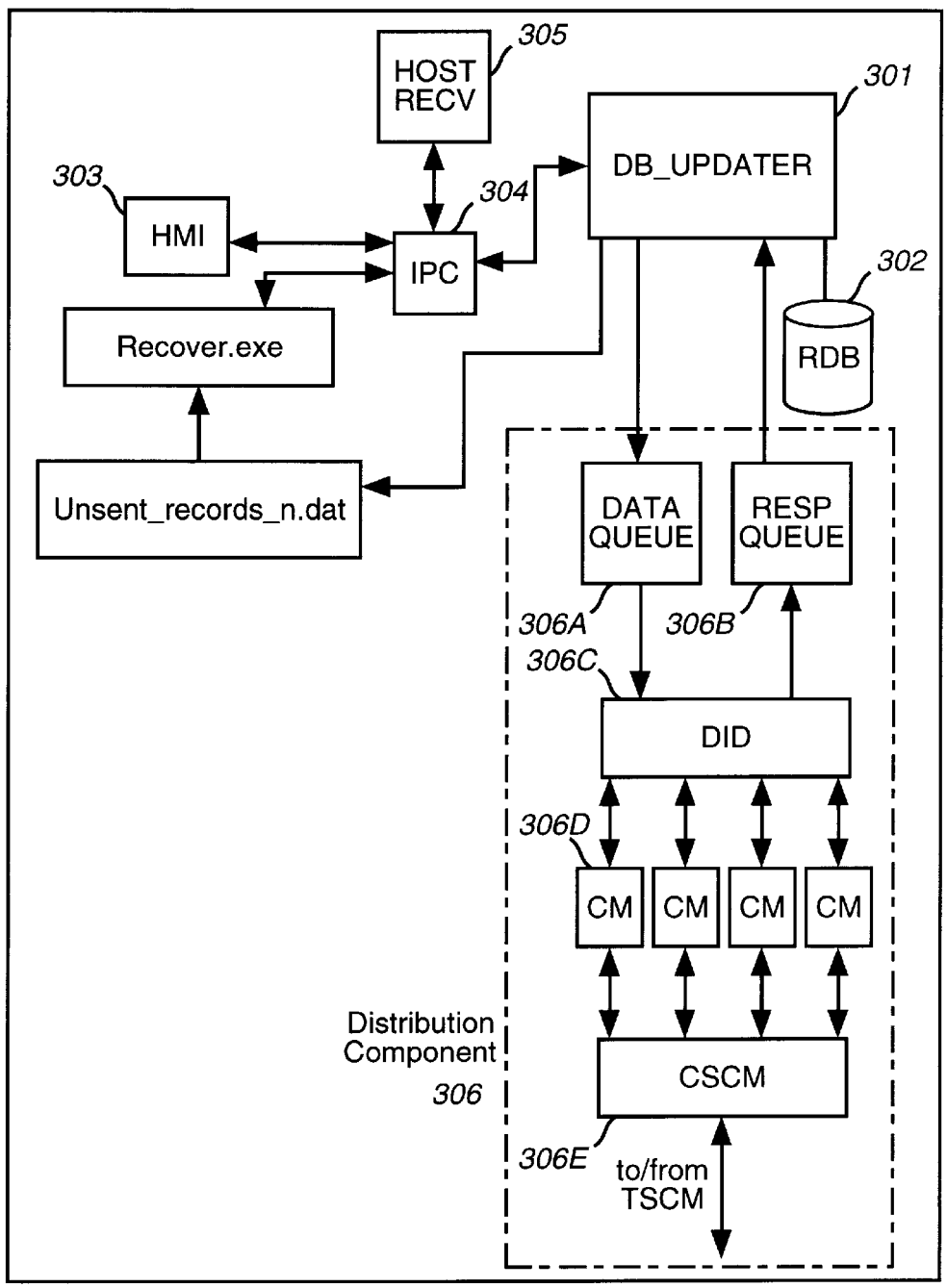
FIG. 3 is a block diagram of the components of the ISNAP Control and Distribution System (ICDS).

The ISNAP Control and Distribution System (ICDS) is responsible for the distribution of the call routing specifications and other information to the ISNAP nodes. The ICDS also controls the processing of the ISNAP nodes of multiple ISNAP sites. FIG. 3 is a block diagram of the components of the ISNAP Control and Distribution System (ICDS). The ICDS comprises a DB Updater component 301, a Database 302, a Human Machine Interface component 303, an Interprocess Communication (IPC) component 304, a Host Receive component 305, and a Distribution component 306.

Figure 4A:
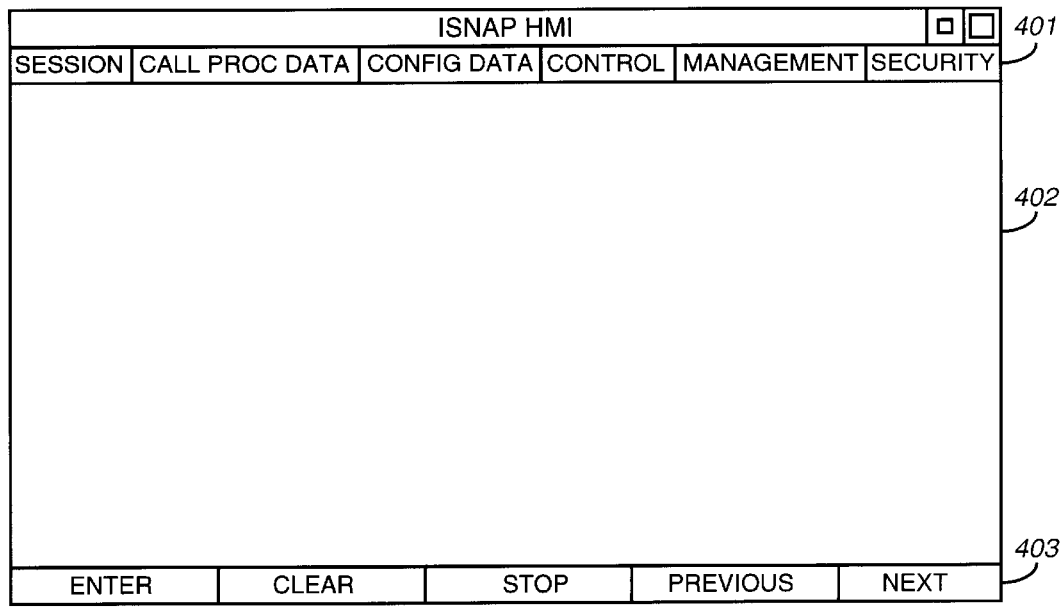
Figure 4B:
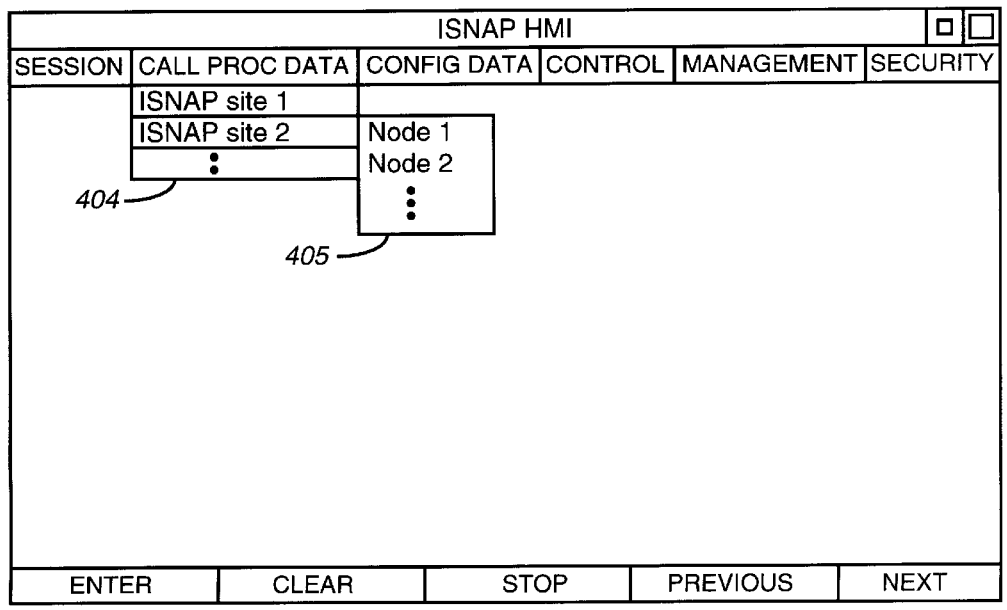

The Human Machine Interface (HMI) component controls the ISNAP nodes. Since the HMI component executes on a different computer than the ISNAP nodes, the load on the ISNAP nodes is reduced because the ISNAP nodes do not need to support a user interface. The HMI component allows a user to update various tables that provide the call routing specifications, various tables to control the configuration of the ISNAP nodes, and displays data describing the operation of the ISNAP nodes and the ICDS node. FIGS. 4A–4C illustrate sample displays generated by the HMI component. FIG. 4A shows the basic display. Each display includes the menu bar 401, the display area 402, and the buttons 403. The HMI component provides a session menu, a call processing data menu, a configuration data menu, a control menu, a management menu, and a security menu. FIG. 4B shows a sample display of cascading menus. In this example, when a user selects the call processing data menu, the identification of each of the various ISNAP sites that can be controlled by the ICDS is displayed in a drop down menu 404. When a user selects an ISNAP site, the identification of each ISNAP node at that site is displayed in a drop down menu 405. FIG. 4C shows a sample display for modifying data in a Group Selection table.

The user selects a table and an action to perform on the selected table.

FIGS. 5A and 5B show the menu options available for each menu. The session menu allows a user to exit the current session with the HMI component. The call processing data menu allows a user to update the group selection tables. The configuration data menu allows a user to update the configuration tables. The control menu allows a user to start and stop the various components of the ISNAP nodes and the ICDS node and to revise the status of the components. The management menu allows a user to monitor the operational measurements of the ISNAP components. The security menu controls management of user access to the ICDS.

The DB Updater component is responsible for the distribution of the information in the database to the ISNAP nodes. When the HMI component receives a request to update the database, the HMI component forwards the request to the DB Updater component. The DB Updater component validates the data, updates the database, and places the updated record in the Data Queue 306a. The DID component 306c then sends the record to all the ISNAP nodes. When the DID component has delivered the update and has a satisfactory response from all the ISNAP nodes, it removes the record from the Data Queue and places a response in the Response Queue 306b. The DB Updater component checks the response status in the Response Queue and, if positive, discards it. If the response status is negative, however, the DB Updater component sends out an alarm, sets a flag, and resends the update one more time. If on the second attempt the status is negative, the DB Updater component sends out an alarm, writes the record to a binary file, and removes it from the Response Queue.

The DID (DAP Information Distributor) "guarantees" delivery of data to multiple endpoints (i.e., ISNAP nodes). The DID component communicates with the DB Updater component via the Data and Response Queues. When an update is placed in the Data Queue, the DID component assigns a transaction ID, places the update in the respective output mailbox to be delivered to the endpoint, and sets a timer. The DID component performs three phases while trying to deliver an update. During the first phase, the DID component sends the update once a minute for five minutes. During the second phase, the DID component sends the update once every two minutes for ten minutes. And in the third and final phase, the DID component sends the update once every twenty minutes indefinitely. When the DID component finally receives a response, it removes the update and places it in the Response Queue with the original update appended.

The Communications Manager (CM) components 306d is an interface between the CSCM component and the DID component. When the DID component puts data in its output mailbox, the CM component hands it to the CSCM component. Likewise, when a response comes back from the CSCM component, the CM component places it in the appropriate mailbox.

The Client/Server Communications Manager (CSCM) component 306e maintains the logical link and transmits the data from the ICDS node and the ISNAP nodes. The CSCM component has three layers. The top layer, called the application layer, consists of the APIs. The middle layer, called the Distribution Layer, distributes messages to and from the clients. The bottom layer is called the task-to-task layer and maintains communication links with the ISNAP nodes.

FIGS. 6A–6K is a diagram of various tables used by the Group Selection component and maintained and distributed by the ICDS. Each table contains records with a unique key and data. The data generally specifies the group of operator consoles to which a call with information of that key should be routed. FIG. 6A is a diagram of the Number Plan Area (NPA) table. An NPA is an area code. A telephone call to a number within a specific NPA may be routed to a specific group of operator consoles based on the type of call. The key to the NPA table is a combination of the ACD switch identifier and the NPA code. Each entry in the table contains the indication of the group for the 0–, 0+, and 01+ types of calls and for a call that has timed out and a default group for all other types of calls.

FIG. 6B is a diagram of the Associated Automatic Number Identifier (ANI) table. The Associated ANI table defines associations of ANIs with 800 numbers. There are five Associated ANI tables for ANIs of different lengths (i.e., 3, 6, 10, 15, and 25). The key to the associated ANI table is the combination of the association identifier and the ACD switch identifier. Each record identifies the group for the association. The ANI table may contain the identifier of an association to which an ANI belongs. If the ANI belongs to an association, then the group for that call is selected from the ANI table.

FIG. 6C is a diagram of the Carrier table. A carrier is a long distance telephone company. The Carrier table defines to which group the calls for each carrier should be routed. Groups are defined for various types of calls. The key to the Carrier table is a combination of the ACD switch identifier and the carrier number. Each record contains the groups for the 0−, 0+, 01+, timeout, inbound international, direct distance dial, and other calls. The records also contain an MCI carrier flag and a reorigination carrier flag to indicate whether the carrier is MCI or whether the carrier carries reoriginated calls.

FIG. 6D is a diagram of the Group table. The Group table defines the operator console groups to which calls can be directed. The table holds the translations from the three-digit group identifier used by ISNAP nodes to the ten-digit group identifier used by the ACD. The key is the combination of the ACD switch identifier and a group identifier. The data of the record comprises the ACD group and the group name. Before a group is provided to the ACD, it is translated to the ten-digit group identifier.

FIG. 6E is a diagram of the International table. The International table specifies the group for inbound international calls based on country of origin or language. The table maps country code, language code, and North American conversion codes to a group. The key is the combination of the ACD switch identifier, the pseudo-country code (PCC), the language, and the North American Conversion Code (NACC).

FIG. 6F is a diagram illustrating the layout of the automatic number identifier (ANI) table. An ANI is a customer telephone number. A call originating at a particular ANI may be routed to a specific group of operator consoles depending upon the type of call. There are four ANI tables, one for ANIs of different length (i.e., 7, 10, 15, or 25). The key is a combination of the ACD switch identifier and the customer telephone number. The groups in each entry are for the 0−, 0+, 01+, timeout, and other types of calls.

FIG. 6G is a diagram of the Link table. The Link table contains information on devices and links between the ACD and the ISNAP nodes. The key is a combination of the link ID and the ACD switch identifier. Each record contains the link set identifier, the node name, device name, and a flag indicating when this is a default link. This Link table is not used by the Group Selection component, but rather is used by the ACD Manager component to manage the links to the ACD.

FIG. 6H is a diagram illustrating the layout of the Called Number table. The Called Number table specifies routing for a call from an 800 number. There are four Called Number tables, one for each different length (i.e., 7, 10, 15, and 25) of called number. If the called number is in an association, then a flag indicates the length of the identifier of the association. The key is a combination of the ACD switch identifier and the called number. The data includes the group and, if an association exists, flags indicating the length of the identifier of the association and the identifier of the association in the Associated ANI table.

FIG. 6I is a diagram of the Site Number table. The Site Number table holds the site to group mapping for reorigination group selection. The key to the Site Number table is the site number. The data is the group.

FIG. 6J is a diagram of the Billing Number Nature of Address (BNOA) table. The Billing Number Nature of Address table specifies the group for a reorigination call based on the billing number NOA. The key is the billing number NOA and the data is the group.

FIG. 6K is a diagram of the Associated Originating Switch Identifier (OSID) table. The Associated OSID table holds the originating switch identifier to group mapping for remote access. The key to the table is the combination of the ACD switch identifier, the 15-digit called number, and the originating switch identifier/originating trunk group. The data is the group.

FIGS. 7A–7E comprise a detailed flow diagram of the Group Selection component. The Group Selection component is passed information describing an offered call and returns the selected group to which the call should be routed. In step 7A01, the routine sets the group to a default group. If no other group is selected, then the call is routed to this default group. In step 7A02, if the call is a networked call, then the routine continues at step 7A12, else the routine continues at step 7A03. In step 7A03, if a carrier number (CN) exists in the received call, then the routine continues at step 7A04, else the routine continues at step 7A12. In step 7A04, if the carrier number is in the Carrier table, then the routine continues at step 7A05, else the routine returns the default group. In step 7A05, if the call is a reorigination call, then the routine continues at the reoriginated call section in FIG. 7E, else the routine continues at step 7A06. In step 7A06, if the carrier number indicates that it is MCI, then the routine continues at step 7A07, else the routine returns the group designated in the Carrier table. In step 7A07, if the information digits indicate that the call is a registered access call, then the routine continues at the operator assisted section in FIG. 7D, else the routine continues at step 7A08. In step 7A08, if the called number is a direct distance dial or a 0+ number and if the number plan area is special (that is, in the NPA table), then the routine continues at the called number section of FIG. 7C, else the routine continues at step 7A09. In step 7A09, if the called number is inbound international, then the routine continues at the international call section of FIG. 7B, else the routine continues at step 7A10. In step 7A10, if the called number is 0−, 0+, or 01+, then the routine continues at the operator assist call section in FIG. 7D, else the routine continues at step 7A11. In step 7A11, if the called number is direct distance dial, international, or a networked call, then the routine continues at the called number section in FIG. 7C, else the routine returns the default group from the Billing Number NOA table. In step 7A12, if the information digits indicate registered access, then the routine continues with the operator assist call section in FIG. 7D, else the routine continues at step 7A13. In step 7A13, if the called number is a direct distance dial or a 0+ number and if the number plan area is special, then the routine continues with the called number section in FIG. 7C, else the routine continues at step 7A14. In step 7A14, if the called number is direct distance dial, international, or a networked call, then the routine continues at the called number section of FIG. 7C, else the routine returns the default group.

Figure 7A:
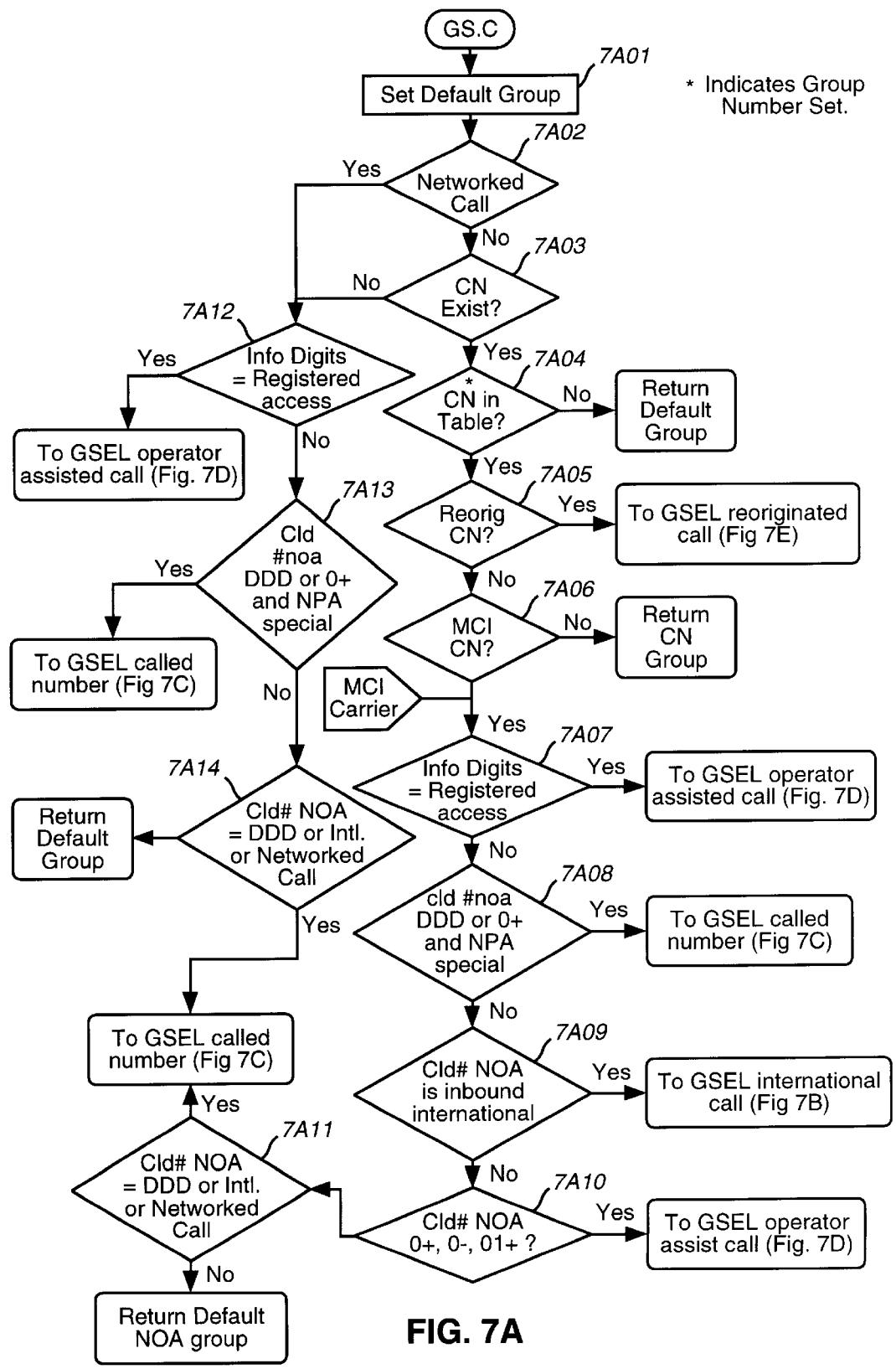
FIGS. 7A–7E comprise a detailed flow diagram of the Group Selection component.
Figure 7B:
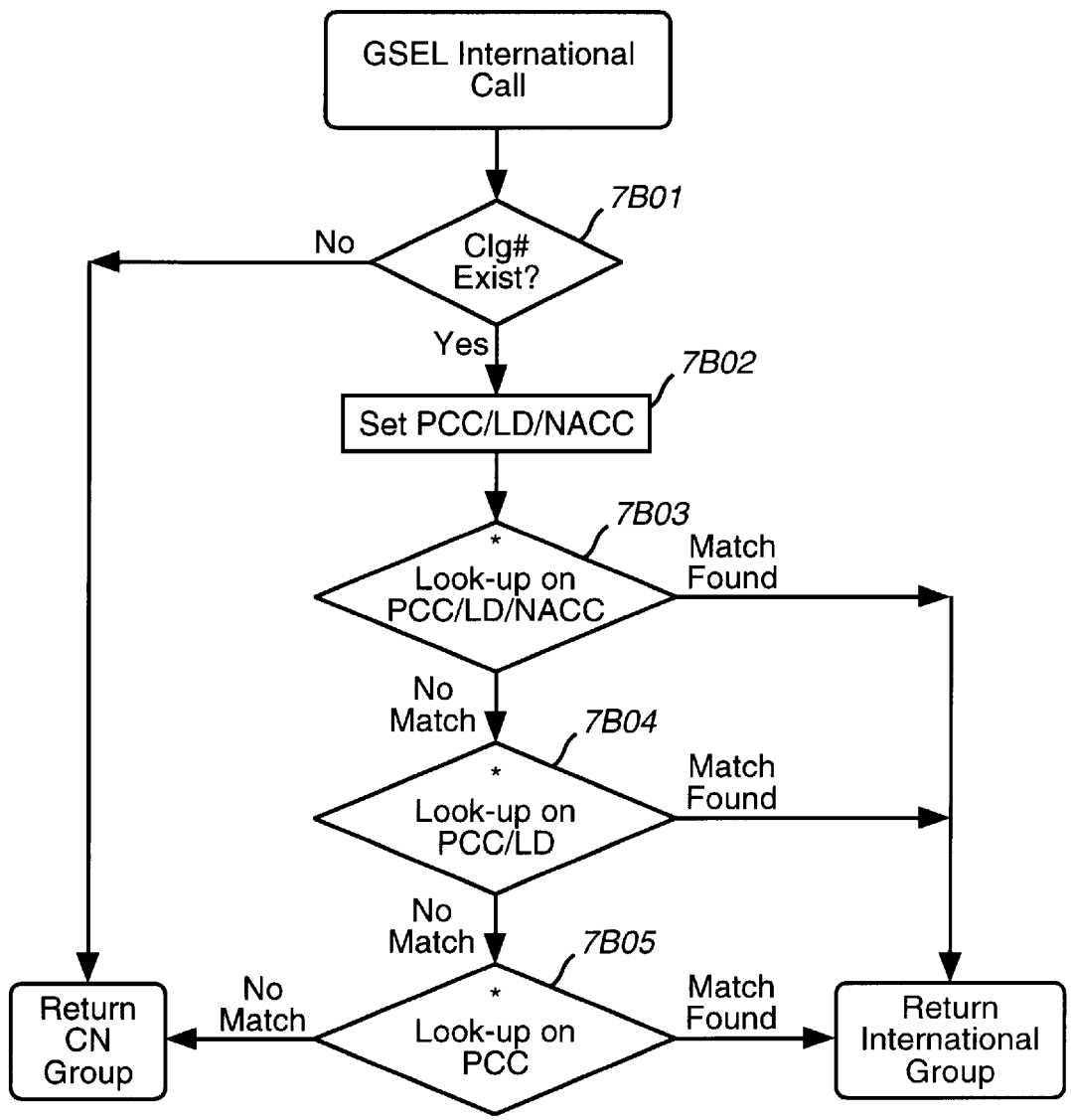

FIG. 7B is a flow diagram of the international call section. This section selects a group for inbound international calls. In step 7B01, if a calling number exists, then the routine continues at step 7B02, else the routine returns the group from the Carrier table. In steps 7B02–7B05, the routine tries to select the group for the International table. In step 7B02, the routine sets the pseudo-country code (PCC), language digits (LD), and North American Conversion Code (NACC).

In step 7B03, the routine looks up the PCC/LD/NACC combination in the International table. If a match is found, then that group is returned, else the routine continues at step 7B04. In step 7B04, the routine looks up the PCC/LD combination in the International table. If a match is found, then the routine returns that group, else the routine continues at step 7B05. In step 7B05, the routine looks up the PCC in the International table. If a match is found, then the routine returns that group, else the routine returns the group from the Carrier table.

Figure 7C:
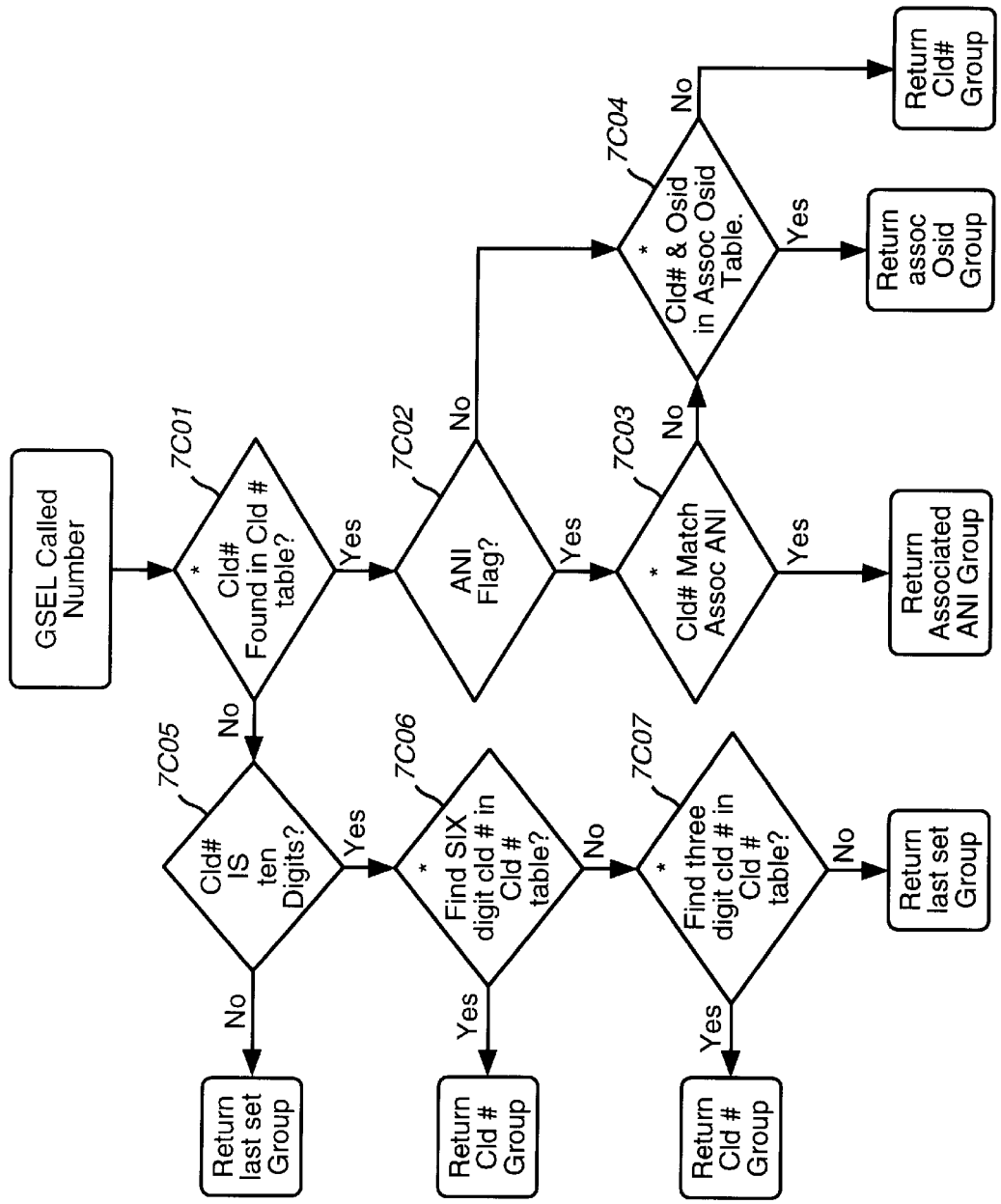

FIG. 7C is a flow diagram of the called number section. This section is performed when the NPA is special. In step 7C01, if the called number is in the Called Number table, then the routine continues at step 7C02, else the routine continues at step 7C05. In step 7C02, if an automatic number identifier (ANI) flag is set in the ANI table, then the routine continues at step 7C03, else the routine continues at step 7C04. In step 7C03, if the called number matches an associated ANI in the Called Number table, then the routine returns the group for the associated ANI from the Associated ANI table, else the routine continues at step 7C04. In step 7C04, if the called number and the originating switch identifier are in the Associated OSID table, then the routine returns the group from that table, else the routine returns the group from the Called Number table. In step 7C05, if the called number is ten digits, then the routine continues at step 7C06, else the routine returns the last group that was set. In step 7C06, if a six-digit called number is in the Called Number table, then the routine returns the group from the Called Number table, else the routine continues at step 7C07. In step 7C07, if the three-digit Called Number is in the Called Number table, then the routine returns the group from the Called Number table, else the routine returns the last group that was set.

Figure 7D:
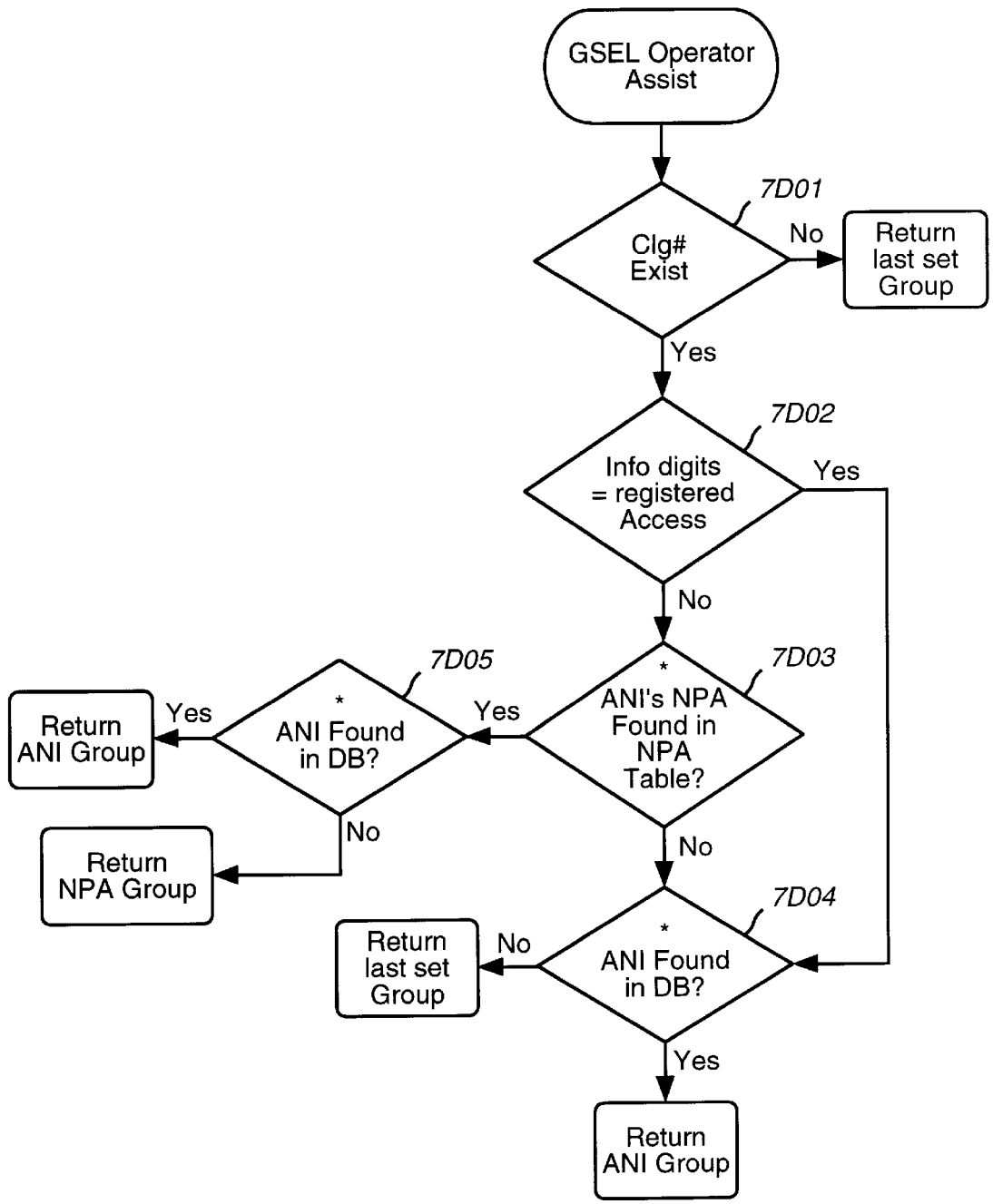

FIG. 7D is a flow diagram of the operator assist section. This section is performed for 0−, 0+, and 01+ calls and for registered access calls. In step 7D01, if the calling number exists, then the routine continues at step 7D02, else the routine returns the last group that was set. In step 7D02, if the information digits indicate registered access, then the routine continues at step 7D04, else the routine continues at step 7D03. In step 7D03, if the Number Plan Area of the ANI of the calling number is in the Number Plan Area table, then the routine continues at step 7D05, else the routine continues at step 7D04. In step 7D04, if the ANI is in the ANI table, then the routine returns that group from the ANI table, else the routine returns the last group that was set. In step 7D05, if the ANI is in the ANI table, then the routine returns that group from the ANI table, else the routine returns the group from the NPA table.

Figure 7E:
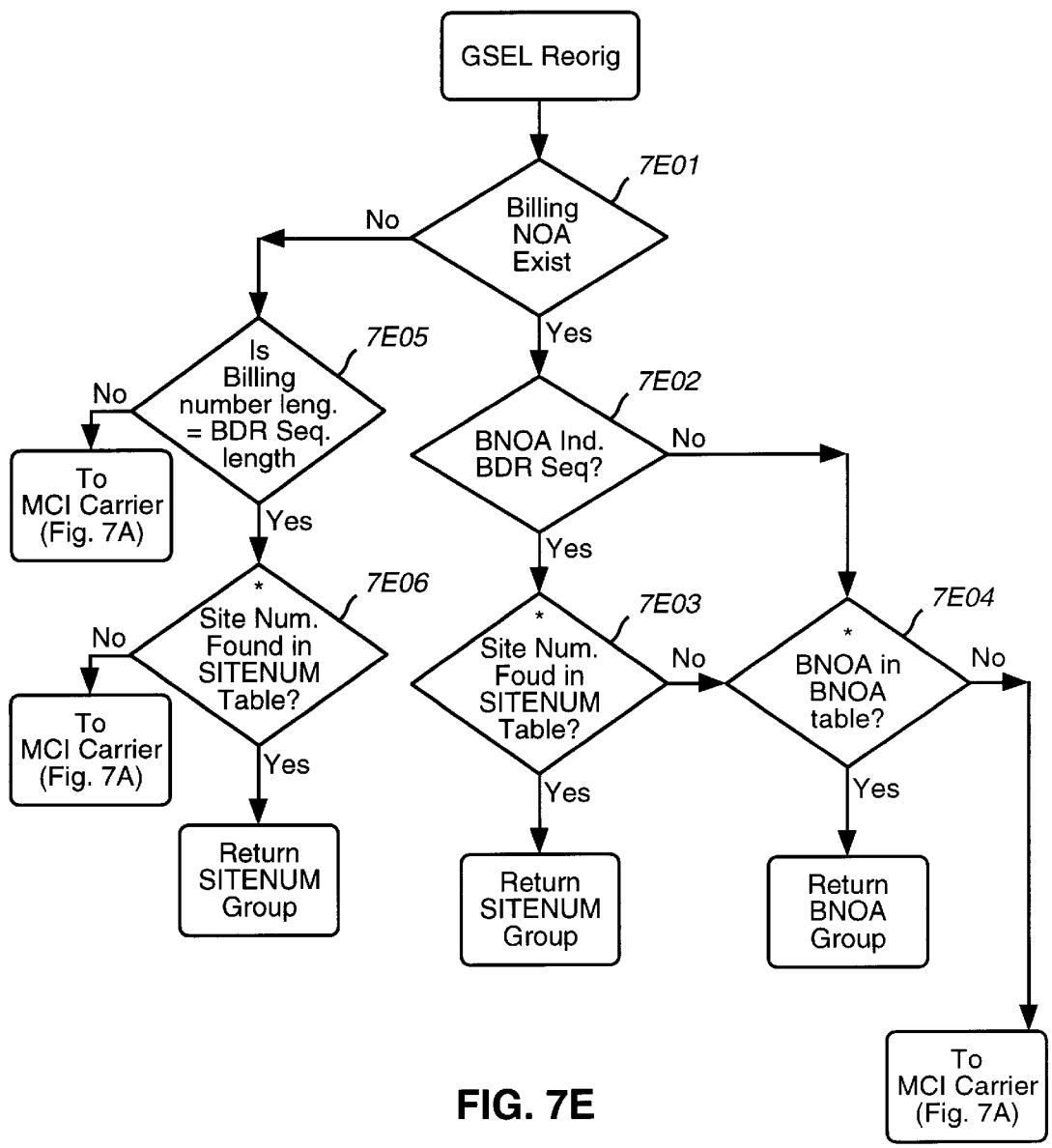

FIG. 7E is a flow diagram of the reorigination section. This section is for handling calls that re-originated when the caller indicates that another call is to be made. In step 7E01, if the billing nature of address exists (i.e., billing information for the previous call exists) then the routine continues at step 7E02, else the routine continues at step 7E05. In step 7E02, if the billing nature of address indicates that a Billing Retail Record (BDR) has been previously written, then the routine continues at step 7E03, else the routine continues at step 7E04. In step 7E03, if the site number is found in the Site Number table, then the routine returns the group from the Site Number table, else the routine continues in step 7E04. In step 7E04, if the billing nature of address is in the Billing Number Nature of Address table, then the routine returns the group from the Billing Number NOA table, else the routine continues processing at the MCI carrier entry point of FIG. 7A. In step 7E05, if the billing number length is equal to the BDR sequence length, then the routine continues at step 7E06, else the routine continues at the MCI carrier entry point of FIG. 7A. In step 7E06, if the site number is found in the table from the Site Number table, then the routine returns the group from the Site Number table, else the routine continues at the MCI carrier entry point of FIG. 7A.

As described above, the Update Manager component of the ISNAP system is responsible for updating the tables of the ISNAP system. The updates are received from an ICDS node. Upon initialization, the Update Manager component determines whether or not the tables are available on disk and in memory. If a certain table is not on the disk, then the Update Manager component creates it. If a certain table is not in memory, the Update Manager component loads the disk version of the table into memory. The Update Manager component receives from the DB Update component of the ICDS messages to add, update or delete to the memory resident tables. When an add or update is requested, the Update Manager component receives the whole record. When a delete is requested, only the key is received. Upon receiving the request, the Update Manager component updates the tables in memory and on disk.

Since the Group Selection component cannot be used when the tables are not in memory, the Update Manager component and the Group Select component use a system of a lock and multi-phase startup. These components use a combination of Lock Management and multi-phase startup to synchronize the memory-resident table update operation. The Update Manager component needs to finish loading the memory resident tables into memory before the Group Selection component accesses them. The Update Manager component is started before the Group Selection. The Update Manager component attempts to perform checks on the disk and memory resident tables. During these checks a table can be marked as loaded or not loaded. If any of the tables are not loaded then Update Manager component enqueues a LOCK, then loads the tables in memory. The Group Selection component then starts up and performs initial startup procedure. The Group Selection component then attempts to enqueue the same LOCK. The Group Selection component waits to get the LOCK and the LOCK will be granted when the Update Manager component has completed loading tables.

When a failure occurs, the Update Manager component stops and is restarted. During startup the LOCK is enqueued again. The Group Selection component will receive notification and dequeue the LOCK so that the tables can be reloaded.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A call processing system for routing telephone calls to operator consoles, comprising:

at least a first automated call distributor (ACD) coupled to a plurality of adjunct processor nodes via a plurality of linksets, each linkset coupled to at least two of said plurality of adjunct processor nodes and operative for receiving a call offered for routing and offering notification of said call to said plurality of adjunct processor nodes via said linksets;

a call distributing system coupled to said plurality of adjunct processor nodes for inputting call routing specifications and for distributing said call routing specifications to said plurality of adjunct processor nodes;

said plurality of adjunct processor nodes responsive to said offered call notification to query said call routing specifications to determine to which operator console said offered call should be routed and providing an indication representing said determined operator console to said ADC; and said ADC operative to route said call to said determined operator console in accord with said call routing specifications.

2. The call processing system of claim 1 wherein each adjunct processor node stores the call routing specifications in memory so that, when notified that a call has been offered, the adjunct processor node determines the operator console by accessing the in-memory call routing specifications.

3. The call processing system of claim 1 wherein each adjunct processor node comprises a Digital Equipment Corporation Alpha processor.

4. The call processing system of claim 1 wherein the ACD sends and receives messages to operator consoles via said linksets, wherein operator consoles send and receive messages to and from the ACD, and wherein each adjunct processor node routes messages received from the ACD to the operator consoles and routes messages received from the operator consoles to the ACD.

5. The call processing system of claim 1 wherein each adjunct processor node includes:

an ACD manager component for controlling the interface between the ACD and the adjunct processor; and a group selection component coupled to said ACD manager component for receiving call information from said ACD manager component describing an offered call and selecting a group of operator consoles to which the call should be routed based on the call routing specifications.

6. The call processing system of claim 5 wherein the ACD manager selects a group of operator consoles to which the offered call should be routed based on predetermined call routing specifications when the group selection component is not available.

7. The call processing system of claim 5, including an update manager for receiving call routing specifications from a control and distribution system and for storing the call routing specifications in both primary storage and secondary storage.

8. The call processing system of claim 5, wherein each said adjunct processor node includes a human machine interface component for receiving from a control and distribution system requests to provide status of the adjunct processor node and for providing status of the adjunct processor node to said control and distribution system.

9. The call processing system of claim 1, including a control and distribution system having:

a human machine interface component for inputting the call routing specifications, for validating the specifications, and for effecting the storing of the call routing specifications; and a database updater component for retrieving the call routing specification and for distributing the call routing specification to the adjunct processor nodes.

10. A method in a computer system for distributing call processing information from a control and distribution system to each of a plurality of call processing systems that are coupled to an automated call distributor, the method comprising:

collecting the call processing information at the control and distribution system; and sending the call processing information to each of the call processing systems;

receiving the call processing information at each of the call processing systems; and storing the received call processing information in both primary storage and secondary storage of the call processing system so that the information is immediately accessible for call processing through primary storage and is accessible for backup purposes through the secondary storage.

11. The method of claim 10 wherein the call processing information includes routing specifications for call processing.

\* \* \* \* \*